(12) United States Patent
Schueller et al.

(10) Patent No.: US 9,457,882 B1
(45) Date of Patent: Oct. 4, 2016

(54) MOUNTING ASSEMBLY AND LOCK RING FOR MARINE STERN DRIVE ENGINE

(71) Applicant: Brunswick Corporation, Lake Forest, IL (US)

(72) Inventors: Niel M. Schueller, Fond du Lac, WI (US); David J. Waldvogel, Fond du Lac, WI (US); Steven R. Johns, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 14/608,443

(22) Filed: Jan. 29, 2015

(51) Int. Cl.
  *F16M 1/00* (2006.01)
  *B63H 20/02* (2006.01)
  *F16B 39/24* (2006.01)

(52) U.S. Cl.
  CPC .............. *B63H 20/02* (2013.01); *F16B 39/24* (2013.01)

(58) Field of Classification Search
  CPC ...... B63H 20/02; B63H 20/04; B63H 20/08; F16B 39/24; F16L 3/14; E04G 5/061; E04G 5/001; E04H 2017/1447; E04H 2017/1452
  USPC ........ 411/190–192, 196–197, 173, 136, 167, 411/204, 533, 105, 88, 91, 998, 98, 101, 411/116–119, 129–130; 248/57–59, 72, 248/67.7, 74.1; 470/42; 80/10
  See application file for complete search history.

(56) References Cited

U.S. PATENT DOCUMENTS

| | | | | |
|---|---|---|---|---|
| 687,310 A * | 11/1901 | Hughes | ................... | F16B 39/10 411/90 |
| 813,168 A * | 2/1906 | Peters | ..................... | F16B 39/10 411/130 |
| 1,105,123 A * | 7/1914 | Bardwell | .............. | F16B 39/108 411/197 |
| 1,815,095 A * | 7/1931 | Brandt | .................... | E01B 11/38 411/88 |
| 1,896,679 A * | 2/1933 | Olson | ..................... | F16B 39/24 411/116 |
| 2,845,977 A * | 8/1958 | Kitchel | ................... | F16B 39/08 411/191 |
| 3,128,741 A * | 4/1964 | Benjamen | ............. | B63H 20/02 440/112 |
| 4,210,372 A * | 7/1980 | McGee | ..................... | B60B 3/14 180/9.62 |
| 4,957,462 A | 9/1990 | Erickson | | |
| 5,478,264 A | 12/1995 | Law | | |
| 5,797,778 A | 8/1998 | Ito et al. | | |
| 7,891,923 B2 * | 2/2011 | Marczynski | .......... | F16B 39/101 411/102 |

* cited by examiner

*Primary Examiner* — Christopher E Garft
(74) *Attorney, Agent, or Firm* — Andrus Intellectual Property Law, LLP

(57) ABSTRACT

A mounting assembly for a stern drive engine including a mounting base, an engine mounting foot or bracket for securing an engine to a watercraft, and a lock ring for securing the engine mounting bracket in a constant position relative to the mounting base. The mounting base includes a threaded mounting bolt to receive a first adjustment nut, the engine mounting bracket, the lock ring and a second nut. The bottom surface of the locking ring engages a top surface of the engine mounting bracket with a downwardly extending arm or arms of the lock ring extending through an aperture in the engine mounting bracket to engage the first adjustment nut. The threaded bolt of the mounting base extends through apertures of the engine mounting bracket platform and mounting ring, and a second nut engages the top surface of the lock ring, preventing rotation of the first adjustment nut, and ultimately limiting movement of the marine stern drive engine.

9 Claims, 5 Drawing Sheets

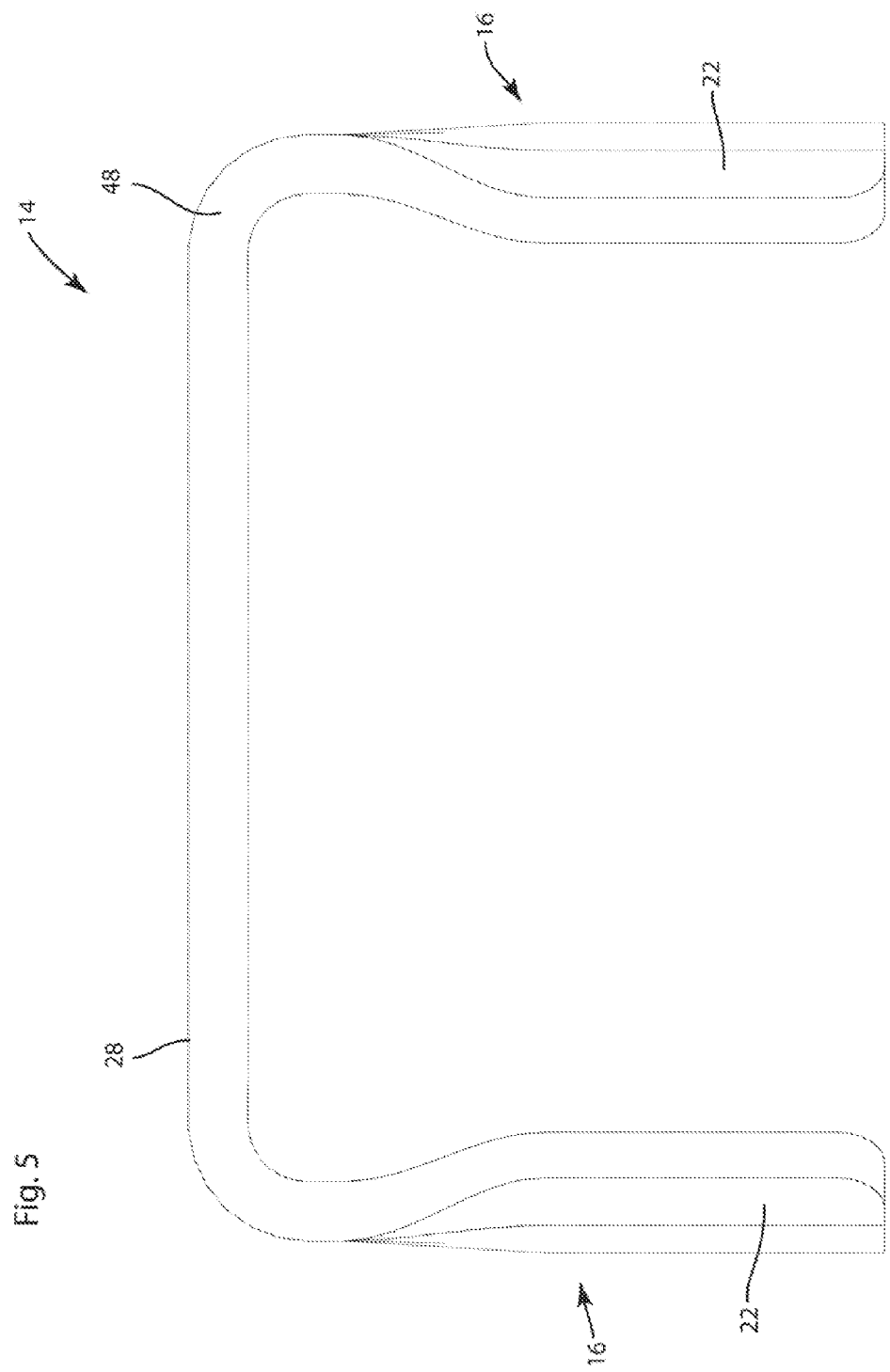

MOUNTING ASSEMBLY AND LOCK RING FOR MARINE STERN DRIVE ENGINE

FIELD

The invention relates to marine stern drives, and more particularly to a mounting assembly for a marine stern drive engine installation.

BACKGROUND AND SUMMARY

A marine stern drive has an inboard engine, an outdrive with a gimbal bearing at the transom of the boat, and a drive coupler shaft extending through the gimbal bearing and between the outdrive and the engine. The drive coupler shaft extends from a universal joint in the outdrive forwardly through the gimbal bearing and into the flexible coupling mounted on the engine. The outdrive is secured to the transom of a watercraft through an inner transom plate having a pair of engine supports thereon for supporting the rear of the engine. The engine has a pair of front mounting assemblies for adjusting the height of the engine for alignment with the outdrive or transmission. The rear mounting assembly are typically adjustable only by shimming.

U.S. Pat. No. 4,957,462 is directed to an engine mount installation tool and method and is assigned to Brunswick Corporation. Therein is disclosed a tool and method for locating the front engine mounting assemblies for both vertical and horizontal alignment. The vertical height adjustment of the front engine mounting assemblies is preset before installation of the engine, such that after the engine is installed, the vertical height adjustment need only be fine tuned, if necessary at all. A unique tool for accessing a difficult to reach adjustment nut of the front engine mounts is also disclosed.

In prior mounting assemblies for marine stern drive engines, a tab washer was utilized below an engine mounting bracket platform to retain an adjustment nut in position to prevent movement of the adjustment nut, and ultimately movement of the engine. However, the height adjustment nut was still known to loosen on multiple occasions. The result of this loosening was a loss of engine alignment and a failed engine coupler. Oftentimes, the tab washer was not sufficiently bent tight against the nut to prevent movement, permitting the adjustment nut to rotate and causing the engine to move. Indeed, it was easy for installers to mistakenly fail or forget to bend the tab washer sufficiently against the nut because of its location under the cast engine mounting bracket where it is difficult to see and access. Further, if the tab washer has bent over a corner of a nut rather than on a wrench flat of the locking nut, a nut will not be retained properly, and will be subject to loosening during regular operation of the watercraft.

The patent described above is hereby expressly incorporated by reference in the description of the present application.

The present application provides a mounting assembly for a marine stern drive engine including a mounting base, an engine mounting foot or bracket for securing an engine to a watercraft, and a lock ring for securing the engine mounting bracket in a constant position relative to the mounting base. The mounting base includes a threaded mounting bolt and a plurality of nuts. The lock ring has a top surface, a bottom surface, an aperture extending through a thickness of a lock ring from a top surface of the bottom surface, an outer periphery and at least one arm downwardly extending from the periphery having an inner surface for interaction with at least one of the plurality of nuts. The engine mounting bracket further comprises a platform having a top surface and a bottom surface with an aperture configured to receive the threaded mounting bolt of the mounting base and at least one arm of the locking ring.

The threaded mounting bolt of the mounting base receives a first adjustment nut, the engine mounting bracket, the lock ring and a second nut such that a bottom surface of the engine mounting bracket engages the first adjustment nut. The bottom surface of the locking ring engages the top surface of the engine mounting bracket platform with the downwardly extending arm of the lock ring extending through the engine mounting platform aperture and engaging the first adjustment nut. The threaded bolt of the mounting base extends through the apertures of the engine mounting bracket platform and mounting ring, and the second nut engages the top surface of the lock ring, preventing rotation of the first adjustment nut. In certain embodiments, the second nut is a locking nut that has a self-locking feature such as a nylon ring or distorted thread that locks the second nut to the threaded bolt.

The first adjustment nut has an outer surface with a plurality of wrench flats and transition points therebetween. When the inner surface of a downwardly extending arm on the lock ring is in position, the inner surface of the downwardly extending arm on the lock ring engages the outer surface of the first adjustment nut. The inner surface of a downwardly extending arm on the lock ring may either engage a wrench flat of the first adjustment nut or a transition point of the first adjustment nut.

The mounting assembly limits the movement of the engine. The mounting base may further comprise at least one flange for connection to the watercraft. Further, the engine mounting bracket is connected to the marine stern drive engine, and the first adjustment nut adjusts the height of the engine mounting bracket and aligns the engine with an outdrive or transmission.

The engine mounting bracket aperture may further include at least one relief to receive the downwardly extending arm of the lock ring and further limit rotational movement of the lock ring. In one embodiment, the lock ring comprises at least two downwardly extending arms and the engine mounting bracket aperture comprises at least two reliefs. In another embodiment, the lock ring comprises at least two downwardly extending arms and the engine mounting bracket aperture comprises two reliefs, and the downwardly extending arms and the reliefs are oppositely spaced from one another.

The present application also contemplates a lock ring for a marine stern drive mounting assembly comprising a top surface, a bottom surface, an outer periphery, an aperture extending through a thickness of the lock ring from the top surface to the bottom surface, and at least one arm downwardly extending from the outer periphery of the lock ring and having an inner surface.

The inner surface of the at least one downwardly extending arm of the lock ring may be concave, alternatively the inner surface may be flat. In both embodiments, the inner surface of the at least one downwardly extending arm of the lock ring is adapted to engage an outer surface of a conventional nut. When the inner surface is a concave surface, the downwardly extending arm may engage a wrench flat of a conventional nut or a transition point of a conventional nut. If the inner surface is flat, the downwardly extending arm is adapted to engage the wrench flat of a conventional nut. In one embodiment, the lock ring comprises at least two downwardly extending arms. In another embodiment, the lock ring comprises two downwardly extending arms spaced oppositely from one another along the periphery of the lock ring.

BRIEF DESCRIPTION OF THE DRAWINGS

The present disclosure is described with reference to the following Figures. The same numbers are used throughout the Figures to reference like features and like components.

FIG. 5 is a front view of a lock ring for a marine stern drive assembly.

DETAILED DESCRIPTION OF THE DRAWINGS

Figure 1:
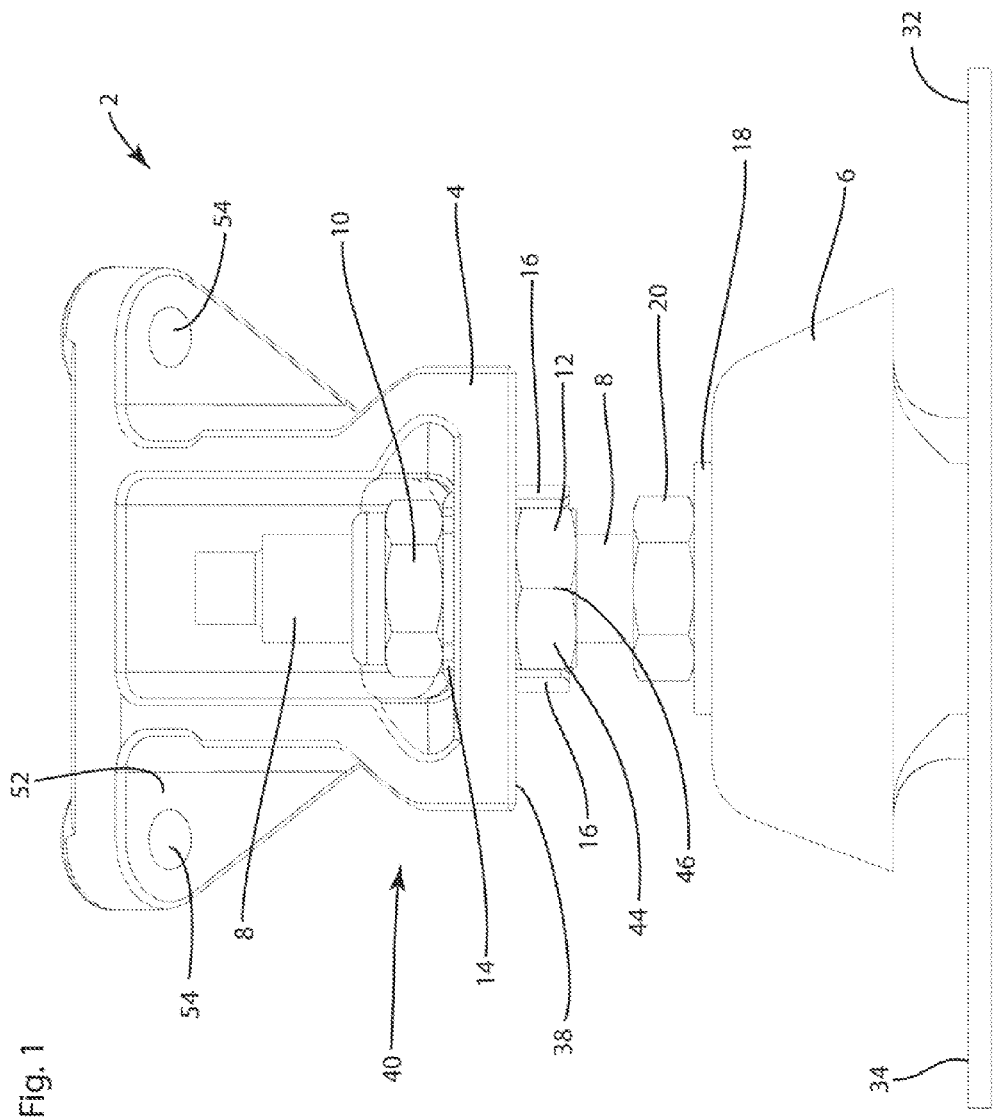
FIG. 1 is a front view of the mounting assembly for stern drive engine.

FIG. 1 shows a mounting assembly 2 for a marine stern drive engine. The engine mounting assembly includes an engine mounting foot or bracket 4 for supporting the front of the engine. The mounting assembly 2 also includes a mounting base 6 having a pair of flanges 32, 34 extending distally or horizontally from the bottom portion of the mounting base 6. The flanges have mounting apertures therein (see FIG. 2) for mounting the mounting base to a watercraft. Mounting base 6 further includes a threaded mounting stud or bolt 8 extending upwardly from the base 6. The threaded mounting bolt 8 receives a plurality of nuts, including, but not limited to, lower nut 20, middle or first adjustment nut 12, and upper or second nut 10.

The engine mounting bracket 4 includes an engine mounting bracket platform 40 including an engine mounting bracket aperture 36 for receiving the threaded mounting bolt 8. The engine mounting bracket 4 also includes an engine mount angle portion 52 for connection to a marine stern drive engine. Apertures 54 facilitate attachment of the mounting bracket 4 to the marine stern drive engine as is known in the art. Through rotation of middle adjustment nut 12, the height of the engine mounting bracket 4 may be adjusted relative to the mounting base 6 to permit alignment of a marine stern drive engine with the outdrive or transmission.

Figure 2:
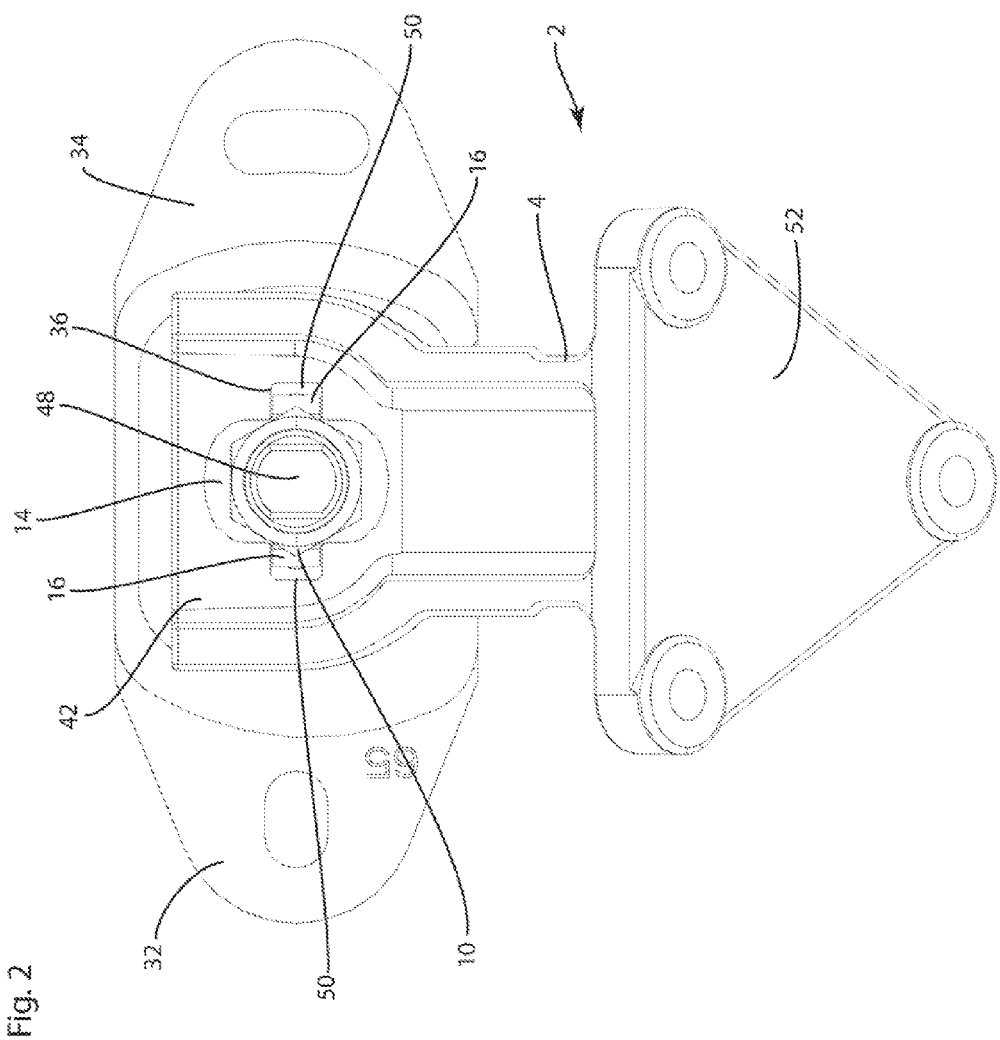
FIG. 2 is a top view of the mounting assembly for stern drive engine.
Figure 3:
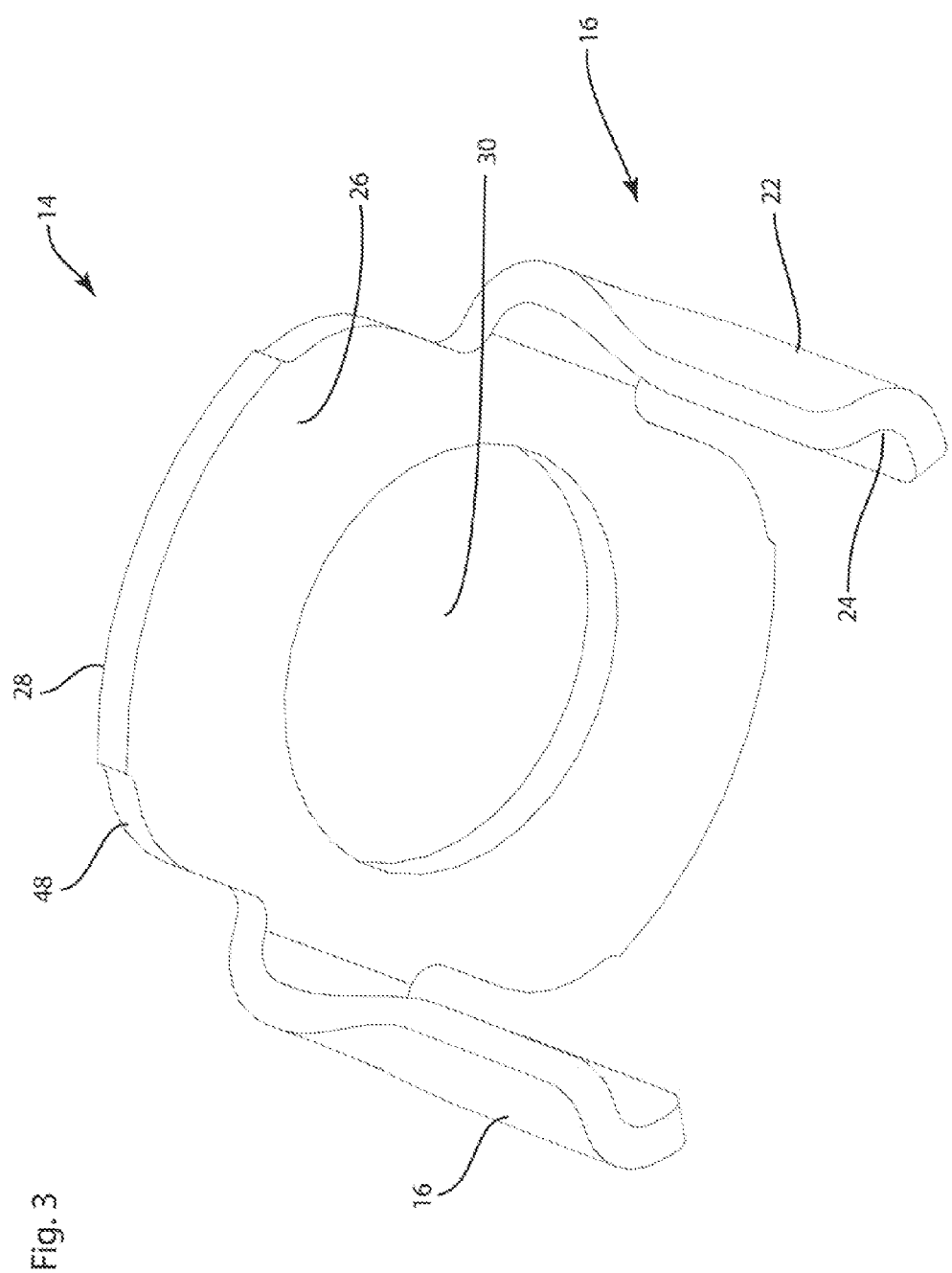
FIG. 3 is a perspective view of the lock ring for a marine stern drive mounting assembly.
Figure 4:
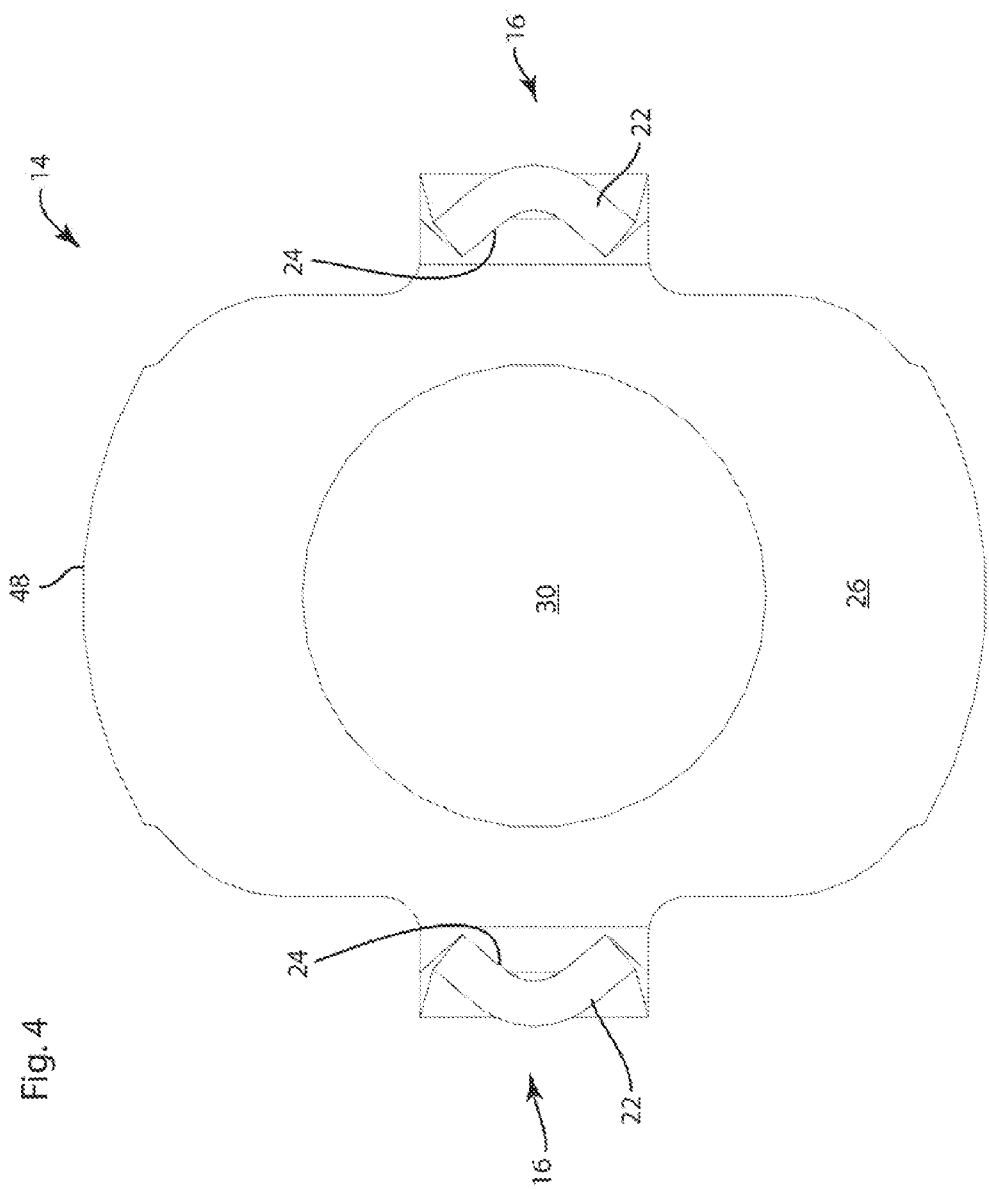
FIG. 4 is a bottom view of a mounting ring for a marine stern drive assembly.

As shown in FIGS. 1-5, the mounting assembly 2 includes a lock ring 14 that prevents rotation of the middle adjustment nut 12. Turning now to FIGS. 3-5, lock ring 14 includes a top surface 28 and a bottom surface 26 with an aperture 30 therethrough. The locking ring 14 has an outer periphery 48 that defines a thickness of the lock ring. The aperture 30 extends through the thickness of the lock ring 14. Extending from the outer periphery 48 of the lock ring 14 is at least one lock arm 16. The lock arm 16 includes an inner surface 24 and an outer surface 22. The inner surface 24 of the lock ring arm 16 is adapted to engage the middle adjustment nut 12 as shown in FIG. 1. As shown in FIG. 2, the engine mounting bracket 4 of the mounting assembly 2 includes at least one engine mounting bracket aperture 36 in the top surface 42 of the platform 40. The engine mounting bracket aperture 36 may include at least one relief 50 for receiving the downwardly extending arm 16 of the lock ring 14 when the mounting assembly is fully assembled. In one embodiment, as shown in FIG. 2, the engine bracket aperture 36 includes at least two reliefs 50, and the lock ring 14 includes at least two lock ring arms 16. However, as one of ordinarily skill in the art will recognize, the lock ring may include only one lock ring arm 16, or alternatively may include a plurality of lock ring arms 16, and a corresponding number of reliefs 50 in the engine bracket apparatus 36.

The middle or first adjustment nut 12 is a conventional nut having a wrench flats 44 and transition points 46. In one embodiment, the lock ring arm 16 of the lock ring 14 has a concave inner surface 24 such that the inner surface may engage either a wrench flat 44 or a transition point 46. In another embodiment, the inner surface 24 may be flat and adapted to engage only the wrench flat 44 of the middle adjustment nut 12.

When fully assembled, as shown in FIGS. 1 and 2, the mounting bolt 8 of the mounting base 6 receives a lower nut 20. The threaded mounting bolt 8 next receives the middle or first adjustment nut 12. Next, the engine mounting bracket 4 is mounted onto the threaded mounting bolt 8 through the engine mounting bracket aperture 36 in the top surface 42 of the engine mounting bracket platform 40. The lock ring 14 is then placed on the threaded mounting bolt 8 with the lock ring arm or arms 16 extending through reliefs 50 in the engine mounting bracket apertures 36. The lock ring arm or arms 16 then in position to engage the middle adjustment nut 12 to prevent rotation of the middle adjustment nut 12 and maintain the engine mounting bracket 4 in position. Finally, an upper or second locking nut 10 is placed on the threaded mounting bolt 8 and tightened to specification to secure the engine mounting assembly 2 together.

In use, the engine mounting assembly 2 may be first secured to a watercraft through apertures and flanges 32 and 34, as noted above. The lower nut 20 and middle or first locking nut 12 may be placed on the threaded mounting bolt 8. Next, the engine mounting foot or bracket 4 will be placed on the threaded mounting bolt 8 and the engine mounting bracket 4 is attached to the stern drive engine through engine mount angle portion 52. The middle or first adjustment nut 12 may then be adjusted to perfect the height of the engine for alignment of the engine to an outdrive or transmission. Once alignment is achieved, the lock ring 14 and the upper locking nut 10 may be placed on the threaded mounting bolt 8 to secure the middle adjustment nut 12 in position and limit movement of the engine.

In the preceding description, certain terms have been used for brevity, clearness and understanding. No unnecessary limitations are to be implied therefrom beyond the prior art because such terms are used for descriptive purposes only and are intended to be broadly construed. The different apparatuses and embodiments described herein may be used alone or in combination with other systems and methods. Various equivalents, alternatives and modifications are possible within the scope of the appended claims.

What is claimed is:

1. A mounting assembly for an outboard marine engine, the mounting assembly comprising:

a mounting base, a lock ring, and an engine mounting bracket for securing an engine to a watercraft; the mounting base further comprising a threaded mounting bolt and a plurality of nuts including a lower nut, a middle adjustment nut, and an upper nut;

the lock ring further comprising a top surface, a bottom surface, an aperture extending through a thickness of the lock ring from the top surface to the bottom surface, an outer periphery and at least one arm downwardly extending from the outer periphery and having an inner surface for interaction with at least one of the plurality of nuts;

the engine mounting bracket further comprising a platform having a top surface and a bottom surface with an aperture configured to receive the threaded mounting bolt and the at least one arm of the locking ring extending therethrough;

wherein the threaded mounting bolt receives the lower nut, the middle adjustment nut, the engine mounting bracket, the lock ring and the upper nut such that a bottom surface of the engine mounting bracket engages the middle adjustment nut, the bottom surface of the lock ring engages the top surface of the engine mounting bracket platform with the downwardly extending arm of the lock ring extending through the engine mounting platform aperture and engaging the middle adjustment nut, the threaded mounting bolt extends though the apertures of the engine mounting bracket platform and locking ring, and the upper nut engages the top surface of the lock ring preventing rotation of the middle adjustment nut;

wherein the middle adjustment nut has an outer surface with a plurality of wrench flats and transition points therebetween, and the inner surface of the downwardly extending arm on the lock ring is concave to engage the outer surface of the middle adjustment nut at either a wrench flat or a transition point of the middle adjustment nut; and wherein the lower nut is rotatable to create a downward force on the mounting base.

2. The mounting assembly of claim 1, wherein the inner surface of at least one of the downwardly extending arms on the lock ring engages the wrench flat of the middle adjustment nut.

3. The mounting assembly of claim 1, wherein the inner surface of at least one of the downwardly extending arms on the lock ring engages the transition point of the middle adjustment nut.

4. The mounting assembly of claim 1, wherein the mounting base further comprises at least one flange for connection to a watercraft.

5. The mounting assembly of claim 1, wherein the engine mounting bracket is connected to the marine stern drive engine and the middle adjustment nut adjusts the height of the engine for alignment to an outdrive or transmission.

6. The mounting assembly of claim 5, wherein the mounting assembly limits movement of the engine.

7. The mounting assembly of claim 1, wherein the engine mounting bracket aperture further comprises at least one relief to receive the downwardly extending arm of the lock ring.

8. The mounting assembly of claim 7, wherein the lock ring comprises at least two downwardly extending arms and the engine mounting bracket aperture comprises at least two reliefs.

9. The mounting assembly of claim 7, wherein the lock ring comprises at least two downwardly extending arms and the engine mounting bracket aperture comprises two reliefs, and further wherein the downwardly extending arms and the reliefs are oppositely spaced from one another.

* * * * *

UNITED STATES PATENT AND TRADEMARK OFFICE
CERTIFICATE OF CORRECTION

PATENT NO.         : 9,457,882 B1
APPLICATION NO.    : 14/608443
DATED              : October 4, 2016
INVENTOR(S)        : Niel M. Schueller, David J. Waldvogel and Steven R. Johns Page 1 of 1

It is certified that error appears in the above-identified patent and that said Letters Patent is hereby corrected as shown below:

In the Claims

In Claim 1, Column 5, Line 17: "though" should instead read --through--.

Signed and Sealed this
Twenty-seventh Day of December, 2016

Michelle K. Lee
*Director of the United States Patent and Trademark Office*